United States Patent [19]

Chevalier

[11] Patent Number: 4,488,699
[45] Date of Patent: Dec. 18, 1984

[54] DEVICE FOR REGULATING THE POSITION OF AN ELEMENT AND IN PARTICULAR A VEHICLE SEAT STRUCTURE

[75] Inventor: Claude Chevalier, Sully sur Loire, France

[73] Assignee: Compagnie Industrielle de Mecanismes, en abrege C.I.M., France

[21] Appl. No.: 341,341

[22] Filed: Jan. 21, 1982

[30] Foreign Application Priority Data

Jan. 21, 1981 [FR] France ............................ 81 01028

[51] Int. Cl.³ ............................................ A47C 1/025
[52] U.S. Cl. .................................... 248/396; 297/313
[58] Field of Search ............ 248/371, 372.1, 393, 248/394, 395, 396, 397, 398, 157, 422; 297/325, 326, 327; 74/527

[56] References Cited

U.S. PATENT DOCUMENTS 4,229,041 10/1980 Werner ............................... 248/393
4,244,237 1/1981 Sprunger ............................ 74/527
4,387,874 6/1983 Boisset ............................... 248/371

FOREIGN PATENT DOCUMENTS 1430929 11/1968 Fed. Rep. of Germany ...... 297/344
585196 1/1947 United Kingdom .
2054731 2/1981 United Kingdom ................ 248/371

Primary Examiner—J. Franklin Foss
Assistant Examiner—Robert A. Olson

[57] ABSTRACT

A device for regulating the position of an element with respect to a support, in which two movable structures are spaced from each other and are fixed to the element, two fixed structures are spaced apart and fixed to the support, and an actuating means comprised of a transverse slide having stepped diameters and slidable in a first structure and engaged in a slot including a plurality of circular apertures having a diameter equal to a larger diameter of the slide and a slot portion interconnecting the apertures having a diameter slightly greater than a smaller slide diameter.

8 Claims, 6 Drawing Figures

DEVICE FOR REGULATING THE POSITION OF AN ELEMENT AND IN PARTICULAR A VEHICLE SEAT STRUCTURE

The present invention relates to a device for regulating the position of an element and in particular a vehicle seat with respect to the support therefor, of the type comprising two movable structures which are transversely spaced apart from each other and fixed to said element, two fixed structures which are transversely spaced apart and fixed to said support, and an actuating means adapted to simultaneously lock the two movable structures which respect to the two fixed structures in a plurality of positions and to simultaneously unlock the two movable structures, said actuating means comprising, on one hand, on each side, a transverse slide having stepped diameters and slidable in a first structure and engaged in a slot in the other structure which defines a plurality of circular apertures having the larger diameter of said slide, said apertures being interconnected by portions whose width is a little greater than the smallest diameter of the slide and, on the other hand, a transverse shaft connected to the two slides, means for transversely displacing the two slides in synchronism.

In the known devices of this type (see for example British Pat. No. 585,196), the two slides are rigidly secured to the transverse shaft which interconnects them and are displaced axially in the same direction by a lateral shifting lever. This requires excessive precision in the distance between the structures and the slides for reliable operation.

An object of the invention is to provide a simple and strong device which accommodates without inconvenience relatively large variations in the transverse distance between the two pairs of structures.

The invention accordingly provides a regulating device of the aforementioned type, wherein the transverse shaft is connected to at least one of the slides by a slidable connection means, and the shifting means comprise, for each slide, a rotary cam rigid with the slide and with means for driving in rotation, and a counter-cam fixed to said first structures.

In an advantageous embodiment, in particular in the case of the regulation of a vehicle seat, the regulating device comprises a mechanism including two slides at one end of the structures and, at the other end of the structures, on each side, another regulating mechanism which is independent from the first-mentioned mechanism, said two other mechanisms being synchronized by a second transverse shaft which is connected to at least one thereof by a sliding connection means.

The invention will be explained in more detail hereinafter with reference to the accompanying drawings which represent solely one embodiment. In the drawings.

Figure 1:
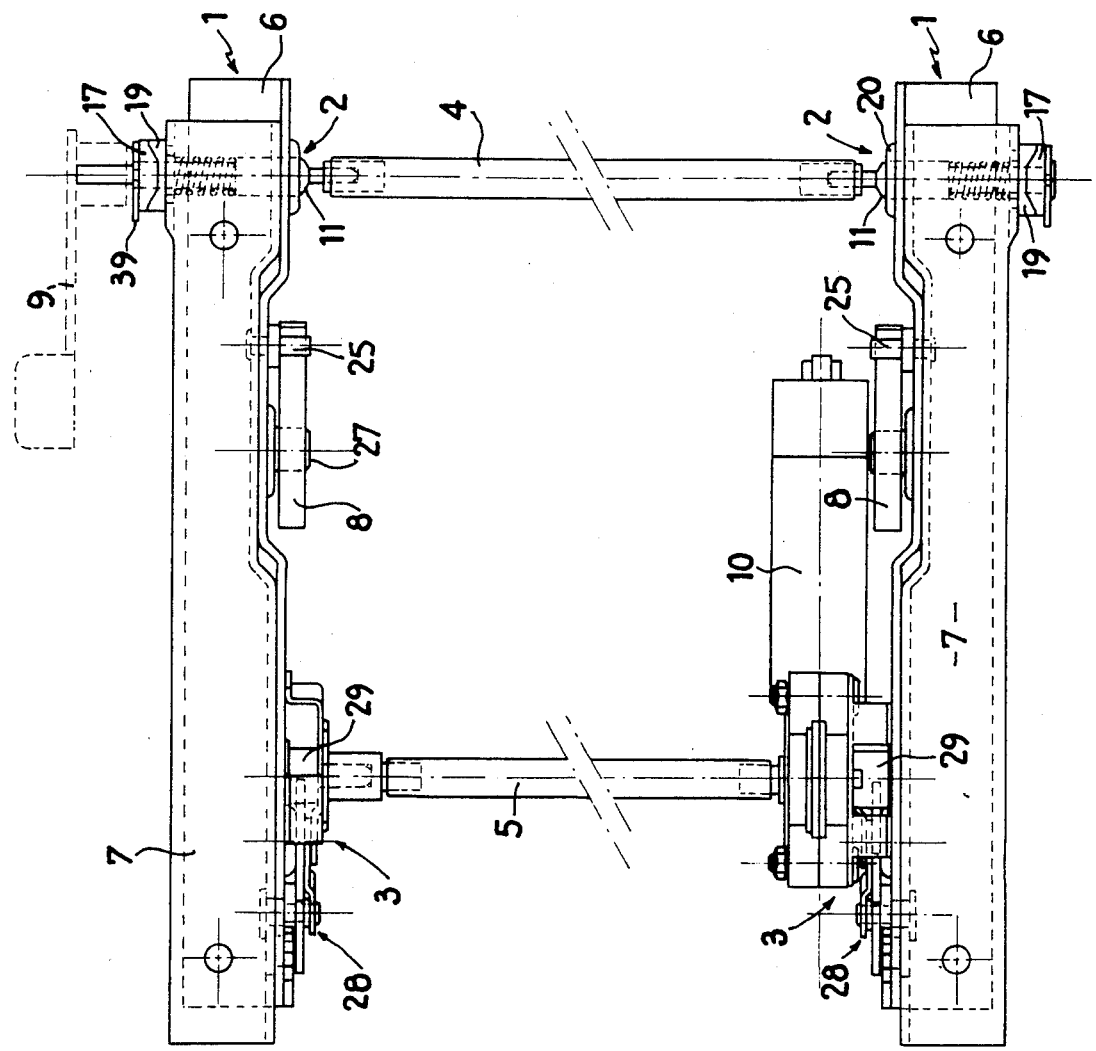
FIG. 1 is a plan view of a regulatable support device for a vehicle seat according to the invention.
Figure 2:
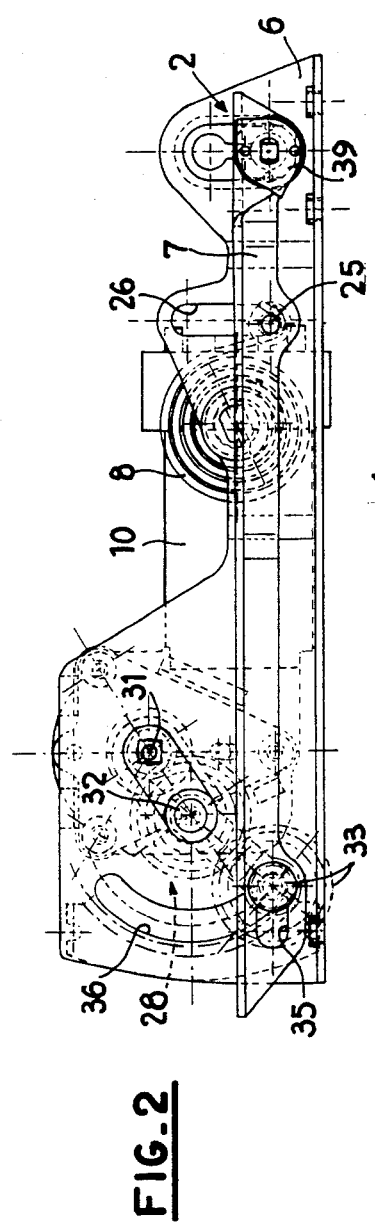
FIG. 2 is a side elevational view of said device.

The device shown in FIGS. 1 and 2 comprises two pairs of longitudinal structures 1 each of which is provided with a rear regulating mechanism 2 and a front regulating mechanism 3, and a rear transverse connection shaft 4 and a front transverse connection shaft 5.

A pair of structures 1 comprises a very rigid structure or L-section support 6 fixed to the upper movable slide of a slide arrangement (not shown) for regulating the longitudinal position of the seat, and a structure or L-section element 7, which is also very rigid and fixed along one side of the lower face of a vehicle seat (not shown). The structures 6 will be termed the "fixed structures" and the structures 7 the "movable structures", the words "fixed" and "movable" being intended to refer to the vertical direction of displacement.

The device further comprises, on each side, a lightening spiral spring 8, a shifting lever 9 for the two mechanisms 2, and an electric motor or a motor-speed reducer unit 10 for actuating the two mechanisms 3, said motor being connected to a suitable actuating circuit (not shown) operable in the two controlled directions by the user of the seat.

Figure 3:
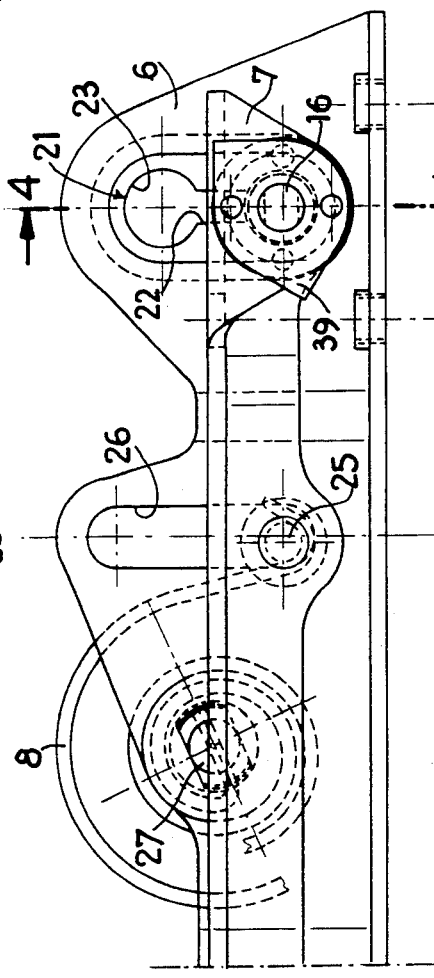
FIG. 3 is a side elevational view, to an enlarged scale, of the rear part of the device.
Figure 4:
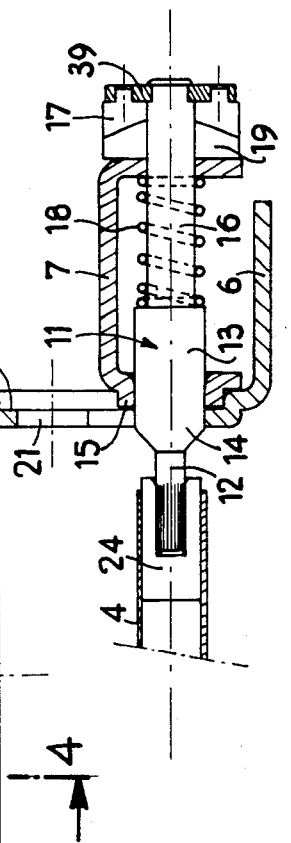
FIG. 4 is a sectional view taken on line 4—4 of FIG. 3.

Each mechanism 2 (FIGS. 3 and 4) comprises a slide 11 which has an inner portion 12 which is of small diameter and splined, an outer portion 13 which has a large diameter and is smooth, and a frustoconical connection portion 14. The portion 13 slides in a collar 15 formed in a branch of a rear region, which has an inverted U-shape, of the movable structure 7, and it is extended by a rod 16 which extends through an aperture in the other branch of said U. The free end of the rod 16 carries a cam 17 in the shape of a trough or a V which is biased by a spring 18, surrounding the rod 16 inside the U, against a cooperative counter-cam 19 which is fixed to the outer face of said U and has the rod 16 extending therethrough.

The collar 15 is vertically slidably mounted in an oblong guiding press-formed recessed portion 20 in the fixed structure 6 which projects inwardly from the latter. Formed in the inner wall of this portion 20 is a slot 21 which extends vertically and constitutes a narrow rectilinear portion 22 which is enlarged at each end thereof in the form of a circular aperture 23. The width of the portion 22 is a little greater than the diameter of the inner portion 12 of the slide 11, and the diameter of the apertures 23 is equal to the diameter of the outer portion 13 of the slide.

The two slides 11 are coaxial and interconnected by the shaft 4 whose end portions are fixedly mounted on splined end members 24 which are slidably mounted on the splined portions 12 of the slides. Projecting from the inner face of each movable structure 7, slightly in front of the mechanism 2, is a circular rivet 25 which extends with clearance through another vertical slot 26 in the fixed structure 6. The rivet 25 tends to be raised by the outer end of the spring 8 whose other end is fixed to a rivet 27 which is fixed to the fixed structure 6. The head of the rivet 25 defines a slight transverse clearance between the two structures.

Figure 5:
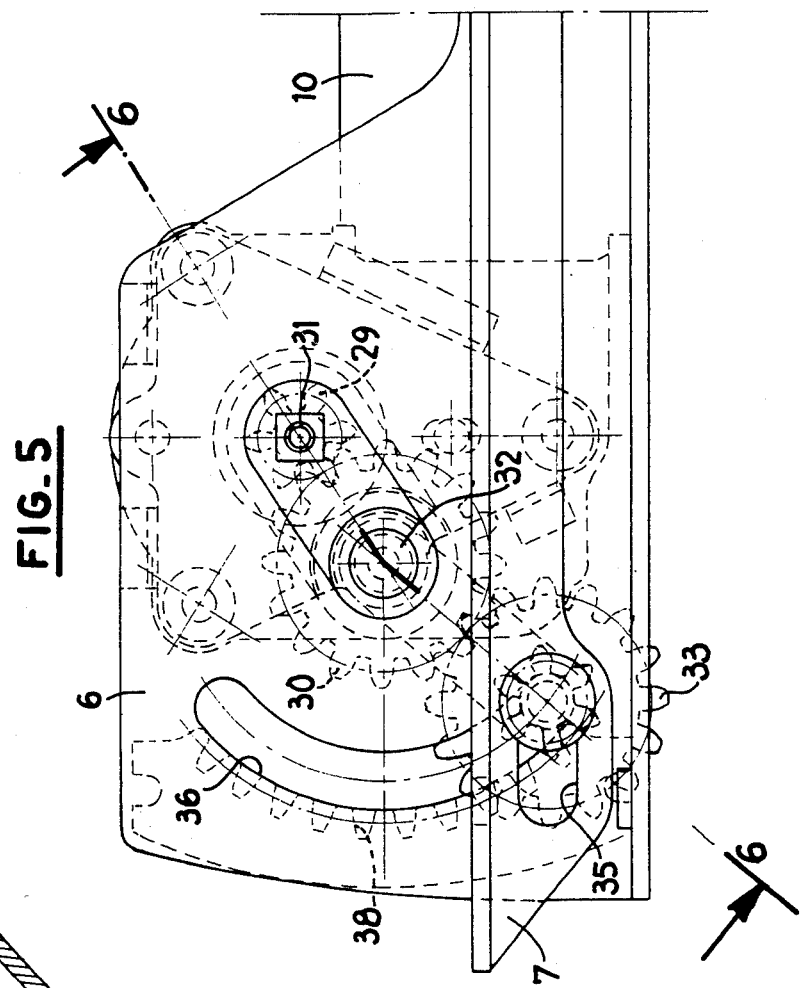
FIG. 5 is a view similar to FIG. 3 of the front part of the device.
Figure 6:
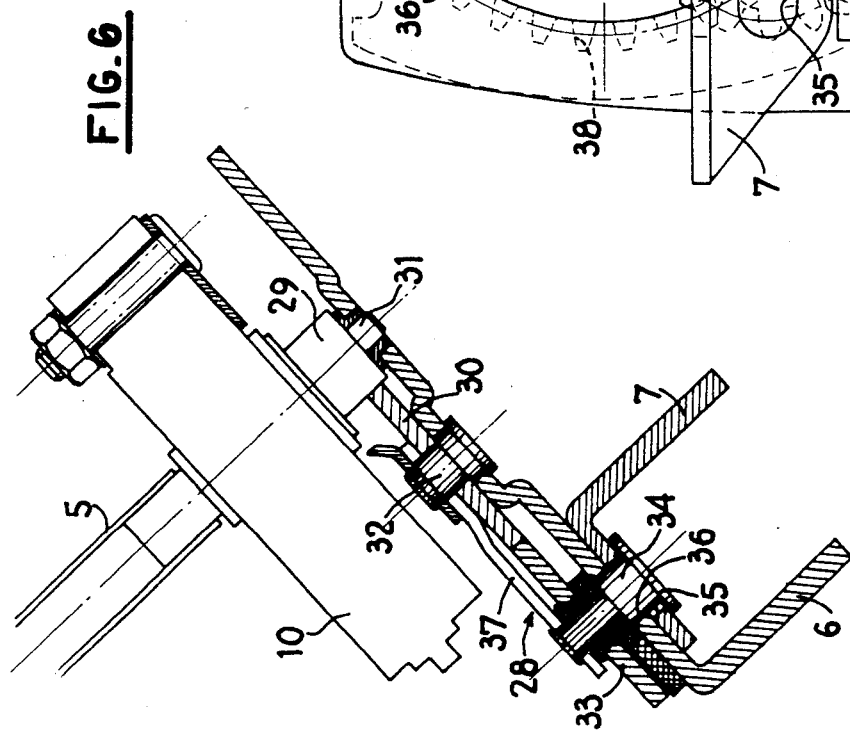
FIG. 6 is a sectional view taken on line 6—6 of FIG. 5.

Each front mechanism 3 (FIGS. 5 and 6) comprises a reducing gear train 28 of the epicyclic type having straight teeth and comprising a drive gear 29 and an intermediate gear 30 which are keyed on shafts 31, 32 journalled in the fixed structure 6, and a stepped driven gear 33, the journal 34 of which extends through a horizontal slot 35, formed in the movable structure 7, and a slot 36 in the shape of an arc of a circle formed in the fixed structure 6. The gear 33 includes teeth of large diameter engaged with the gear 30, this engagement being ensured by a connecting link 37, and teeth of small diameter engaged with a toothed sector 38 which is fixed to the fixed structure 6.

One of the two shafts 31 is the output shaft of the electric motor 10 which extends horizontally along the inner face of the corresponding fixed structure 6, to which structure it is fixed. This shaft 31 extends out of the other side of the motor 10 and is connected to the other shaft 31 by the front shaft 5, the connections being in the form of splined connections.

The device just described operates in the following manner:

The rear of the seat can assume two positions in height which respectively correspond to the insertion of the portion 13 of the two slides 11 in the two apertures 23 of the support structures 6. In order to change from one position to the other, the two slides are simultaneously unlocked by means of the common lever 9 which is fixed to a plate 39 rigid with one of the two cams 17. By raising the lever 9, the latter drives the two cams 17 simultaneously in rotation through the shaft 4. The direction and the extent (90°) of this rotation are determined by the shape of the plate 39 which abuts at the end of the travel against suitable abutments (not shown) on the seat. By rotating through a quarter of a rotation, each cam 17 "rides up" its counter-cam 19 and moves outwardly and drives the associated slide 11 in this direction in opposition to the action of the spring 18.

This brings the two small portions 12 of the slides in the plane of the two slots 21. The user of the seat can then raise or lower the rear of the seat so as to cause the portions 12 to pass through the portions 22 of the slots and bring them into the other apertures 23. In order to effect a downward movement, it is sufficient to bear on the rear of the seat. In order to effect a raising movement, it is sufficient to lighten the rear of the seat and the springs 8 effect the required raising. The user then releases the lever 9 and this allows the springs 18 to urge the slides 11 inwardly, the portions 14 and then the portions 13 of the latter entering the facing aperture 23 and locking the mechanisms 2 in their new position. The combined movement of rotation and translation of the slides facilitates this penetration and the passage from one position to the other produces a noticeable click.

This operation defines a horizontal and transverse axis, which is the axis of the shaft 4, around which the whole of the seat and the movable structures 7 are pivotable in order to regulate the angular position of the seat. This regulation is effected merely by driving the motor 10 in either direction, which shifts the small diameter teeth of the gear 33 along the toothed sector 38.

The regulation in height effected by the mechanisms 2 is required in order to obtain a good driving position and is usually carried out when the vehicle is stationary. The regulation of the angular position of the seat permits obtaining an optimum position of comfort, if desired while the vehicle is travelling.

The design of the mechanisms 2 enables them to withstand very great forces so that the device is compatible with the positioning of the anchorings of the safety belts on the seat itself.

The mechanisms 3 are efficient. The ratio in the reduction of the speeds of the gear trains 28 permits the use of a motor-speed reducer unit 10 of the type employed for window raisers, which permits an appreciable standardization. The placement of this unit 10 along a fixed structure 6, with the output shaft 31 thereof in a transverse position, results in a very small overall size.

The vertical forces, due to the weight of the seat and vibrations, are applied by the horizontal edges of the slots 35 to the journals 34 of the gears 33 and are transferred distinctly more to the toothed sectors 38 than to the intermediate gears 30, owing to the difference in the diameter of engagement of the gears. This provides a good protection of the driving gears 29, 30 and of the motor 10.

The movement is transmitted from one pair of structures 1 to the other by rotation through splined connections. A relatively important variation in the transverse distance between the pairs of structures 1 upon assembly is consequently allowable without inconvenience. Further, the transmission between the two mechanisms 3 occurs on the driving shafts 31 which rotate rapidly and consequently at a low torque, which permits a good synchronization with a shaft 5 of small section.

By way of a modification, the slots 21 may of course have more than two apertures 23 so as to increase the number of raised positions of the seat.

The mechanisms 3 may also be employed at the rear for the regulation in height, and the mechanims 2 in the front, for regulating the angular position of the seat, so as to facilitate carrying out the two regulations while the vehicle is travelling. However, for the aforementioned reasons of safety (greater strength of the mechanisms 3), the illustrated arrangement is usually preferable.

In another modification, the motor 10 may be replaced by a rotary knob for manually regulating the angular position of the seat, in which case each mechanism 3 is provided with a self-locking type of brake, as employed in window raisers. Another manual version would consist in replacing the mechanisms 3 by two other mechanisms 2, the regulation of the angular position of the seat being carried out then by steps, in the same way as the regulation in height, and no longer in a continuous manner.

The profile of the cam 17 may be adapted to the required force. In particular, the faces of the V formed thereby may be curved so as to impart thereto a doubly helicoidal profile.

Having now claimed my invention what I claim as new and desire to secure by Letters Patent is:

1. A device for regulating the position of an element and in particular a vehicle seat, with respect to support therefor, said device comprising two movable structures which are transversely spaced apart from each other and are for fixing to said element, two fixed structures which are transversely spaced apart from each other and are for fixing to said support, and actuating means for selectively simultaneously locking the two movable structures relative to the two fixed structures in a plurality of selected positions and simultaneously unlocking the two movable structures, said actuating means comprising, on each side of the device, a slide extending transversely of the device and having stepped portions having respectively larger diameter and a smaller diameter, the slide being slidable in a first of said structures on said each side, a second structure on said each side defining a slot including a plurality of circular apertures having a diameter equal to said larger diameter of said slide, at least one slot portion interconnecting said apertures and having a width which is a little greater than said smaller diameter of said slide, said actuating means further comprising a shaft which extends transversely of said device and interconnects the two slides, and means for transversely displacing the two slides in synchronism, slidable connection means connecting the shaft to at least one of said slides and said displacing means comprising, for each slide, a rotary cam rigid with the slide and with means for driving in rotation, and a counter-cam fixed to said first structure, wherein said first structure has, on each side of the device and around the slide, a guide collar slidable in a press-formed recessed portion of said other structure.

2. A device according to claim 1, wherein said displacing means comprise means for elastically biasing said slides to a locked position thereof.

3. A device according to claim 1, wherein the cam and the counter-cam are helicoidal cams.

4. A device according to claim 1, wherein the two slides are simultaneously displaceable in opposite directions.

5. A device according to claim 1, comprising a mechanism adjacent one end of the fixed structures and movable structures, another regulating mechanism located adjacent an opposite end of the fixed structures and movable structures independent from the first-mentioned mechanism, a second transverse shaft for synchronizing said two other mechanism and second connection means connecting the second shaft to said two other mechanisms.

6. A device according to claim 5, wherein each of said other mechanisms provides a continuous variation in the regulation and comprises a toothed sector fixed to the corresponding fixed structure, an epicyclic gear train comprising a planet gear which is carried by the corresponding movable structure, the toothed sector engaging the epicyclic gear train, and means for driving one of the epicyclic gear trains, said second transverse shaft interconnecting the two epicyclic gear trains.

7. A device according to claim 6, wherein the second transverse shaft interconnects input gears of the two epicyclic gear trains.

8. A device according to claim 6 or 7, wherein said means for driving one of the epicyclic gear trains comprise an electric motor-speed reducer unit including an output shaft which extends from opposite sides of said unit and carries at one end thereof one of said input gears and is connected at an opposite end thereof to the second transverse shaft through a splined connection means.

* * * * *